US012588079B2

(12) United States Patent
Cozzo et al.

(10) Patent No.: US 12,588,079 B2
(45) Date of Patent: Mar. 24, 2026

(54) METHOD AND APPARATUS FOR SPATIAL SETTING DETERMINATION DURING A RANDOM ACCESS PROCEDURE

(71) Applicant: Samsung Electronics Co., Ltd., Suwon-si (KR)

(72) Inventors: Carmela Cozzo, San Diego, CA (US); Aristides Papasakellariou, Houston, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/626,282

(22) Filed: Apr. 3, 2024

(65) Prior Publication Data

US 2024/0251454 A1    Jul. 25, 2024

Related U.S. Application Data

(63) Continuation of application No. 17/447,564, filed on Sep. 13, 2021, now Pat. No. 12,004,237.
(Continued)

(51) Int. Cl.
*H04W 74/08* (2024.01)
*H04L 5/00* (2006.01)
(Continued)

(52) U.S. Cl.
CPC ......... *H04W 74/085* (2013.01); *H04L 5/0048* (2013.01); *H04W 72/23* (2023.01);
(Continued)

(58) Field of Classification Search
CPC . H04W 74/085; H04W 72/23; H04W 74/002; H04W 74/0833; H04W 74/0836;
(Continued)

(56) References Cited

U.S. PATENT DOCUMENTS

| | | | |
|---|---|---|---|
| 10,721,775 B2 | 7/2020 | Park et al. | |
| 11,533,759 B2 | 12/2022 | Xiong et al. | |

(Continued)

FOREIGN PATENT DOCUMENTS

| | | |
|---|---|---|
| CN | 111132326 A | 5/2020 |
| CN | 111149411 A | 5/2020 |

(Continued)

OTHER PUBLICATIONS

International Search Report of the International Searching Authority in connection with International Application No. PCT/KR2021/012662 dated Dec. 24, 2021, 2 pages.

(Continued)

*Primary Examiner* — Steven Hieu D Nguyen

(57) ABSTRACT

Methods and apparatuses for determining spatial settings during a random access procedure. A method for operating a user equipment includes determining a first physical random access channel (PRACH) preamble for transmission in a first PRACH occasion (RO) using a first spatial setting and determining a second PRACH preamble for transmission in a second RO using a second spatial setting. The method further includes transmitting the first PRACH preamble in the first RO using the first spatial setting and transmitting the second PRACH preamble in the second RO using the second spatial setting. The method further includes receiving a first physical downlink control channel (PDCCH) scheduling a reception of a first physical downlink shared channel (PDSCH) using a third spatial setting associated with the first spatial setting, or a second PDCCH scheduling a reception of a second PDSCH using a fourth spatial setting associated with the second spatial setting.

15 Claims, 13 Drawing Sheets

<div style="display: flex">
<div>

Related U.S. Application Data

(60) Provisional application No. 63/081,056, filed on Sep. 21, 2020.

(51) Int. Cl.

| | |
|---|---|
| *H04W 72/23* | (2023.01) |
| *H04W 74/00* | (2009.01) |
| *H04W 74/0833* | (2024.01) |
| *H04W 74/0836* | (2024.01) |
| *H04W 74/0838* | (2024.01) |

(52) U.S. Cl.
CPC ..... *H04W 74/002* (2013.01); *H04W 74/0833* (2013.01); *H04W 74/0836* (2024.01); *H04W 74/0838* (2024.01)

(58) Field of Classification Search
CPC ............. H04W 74/0838; H04L 5/0048; H04L 5/0053; H04B 7/0695
See application file for complete search history.

(56) References Cited

U.S. PATENT DOCUMENTS

| | | | | |
|---|---|---|---|---|
| 12,004,237 | B2 * | 6/2024 | Cozzo ................. | H04B 7/0695 |
| 2016/0381712 | A1 * | 12/2016 | Yang ..................... | H04L 5/0053 |
| | | | | 370/329 |
| 2017/0311284 | A1 | 10/2017 | Basu Mallick | |
| 2018/0027437 | A1 | 1/2018 | Vitthaladevuni | |
| 2019/0132822 | A1 | 5/2019 | Kim | |
| 2019/0132882 | A1 | 5/2019 | Li | |
| 2020/0053757 | A1 | 2/2020 | Bagheri | |
| 2020/0107373 | A1 * | 4/2020 | Roy ................. | H04W 74/0833 |
| 2020/0260500 | A1 | 8/2020 | Agiwal et al. | |
| 2020/0383167 | A1 | 12/2020 | Sengupta | |
| 2021/0022091 | A1 | 1/2021 | Li | |
| 2021/0051707 | A1 * | 2/2021 | Rastegardoost .......... | H04L 5/10 |
| 2021/0051731 | A1 | 2/2021 | Lee | |
| 2021/0051733 | A1 | 2/2021 | Lee | |
| 2021/0051736 | A1 | 2/2021 | Jeon | |
| 2021/0058799 | A1 | 2/2021 | Chen | |
| 2021/0105761 | A1 | 4/2021 | Cheng | |
| 2021/0105822 | A1 * | 4/2021 | Hakola ............... | H04W 72/046 |
| 2021/0144742 | A1 | 5/2021 | Jeon | |
| 2022/0046724 | A1 | 2/2022 | Maso | |
| 2022/0078856 | A1 | 3/2022 | Jeon | |
| 2022/0417999 | A1 * | 12/2022 | Li ...................... | H04W 74/0833 |
| 2023/0188261 | A1 * | 6/2023 | Awadin ..................... | H04L 1/08 |
| | | | | 370/329 |
| 2023/0209606 | A1 * | 6/2023 | Zhang ................... | H04W 74/04 |
| | | | | 370/329 |

</div>
<div>

FOREIGN PATENT DOCUMENTS

| | | | |
|---|---|---|---|
| WO | 2019049107 | A1 | 3/2019 |
| WO | 2019161784 | A1 | 8/2019 |
| WO | 2019214499 | A1 | 11/2019 |

OTHER PUBLICATIONS

Nokia et al., "Remaining details of 2-step RACH Procedure", R1-1910689, 3GPP TSG RAN WG1 #98bis, Chongqing, China, Oct. 14-18, 2019, 32 pages.

NTT Docomo et al., "PUCCH/PDCCH beam after CBRA-BFR in Rel. 16", R1-2006701, 3GPP TSG RAN WG1 #102-e, e-Meeting, Aug. 17-28, 2020, 4 pages.

Ericsson, "Feature lead summary 3 for beam measurement and reporting", R1-1807782, 3GPP TSG-RAN WG1 Meeting #93, Busan, May 21-25, 2018, 41 pages.

Samsung, "Remaining Issues on Multi-Beam Operation", R1-1808750, 3GPP TSG RAN WG1 Meeting #94, Gothenburg, Sweden, Aug. 20-24, 2018, 7 pages.

Mediatek Inc., "Maintenance for Beam Management", R1-1810427, 3GPP TSG RAN WG1 Meeting #94bis, Chengdu, China, Oct. 8-12, 2018, 5 pages.

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and channel coding (Release 16)", 3GPP TS 38.212 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"5G; NR; Medium Access Control (MAC) protocol specification (3GPP TS 38.321 version 15.8.0 Release 15)", ETSI TS 138 321 V15.8.0, Jan. 2020, 80 pages.

"5G; NR; Radio Resource Control (RRC); Protocol specification (3GPP TS 38.331 version 15.8.0 Release 15)", ETSI TS 138 331 V15.8.0, Jan. 2020, 527 pages.

Extended European Search Report issued Nov. 7, 2023 regarding Application No. 21869737.3, 11 pages.

Ericsson, "DL beam management details", 3GPP TSG-RAN WG1 #89, R1-1708676, May 2017, 5 pages.

Sharp, "Remaining issues on RACH procedure", 3GPP TSG RAN WG1 Meeting #92bis, R1-1804877, Apr. 2018, 4 pages.

Samsung, "Coverage enhancement for channels other than PUSCH and PUCCH", 3GPP TSG RAN WG1 #102, R1-2006164, Aug. 2020, 6 pages.

The First Office Action dated Jan. 30, 2026, in connection with Chinese Application No. 202180061857.2, 18 pages.

* cited by examiner

</div>
</div>

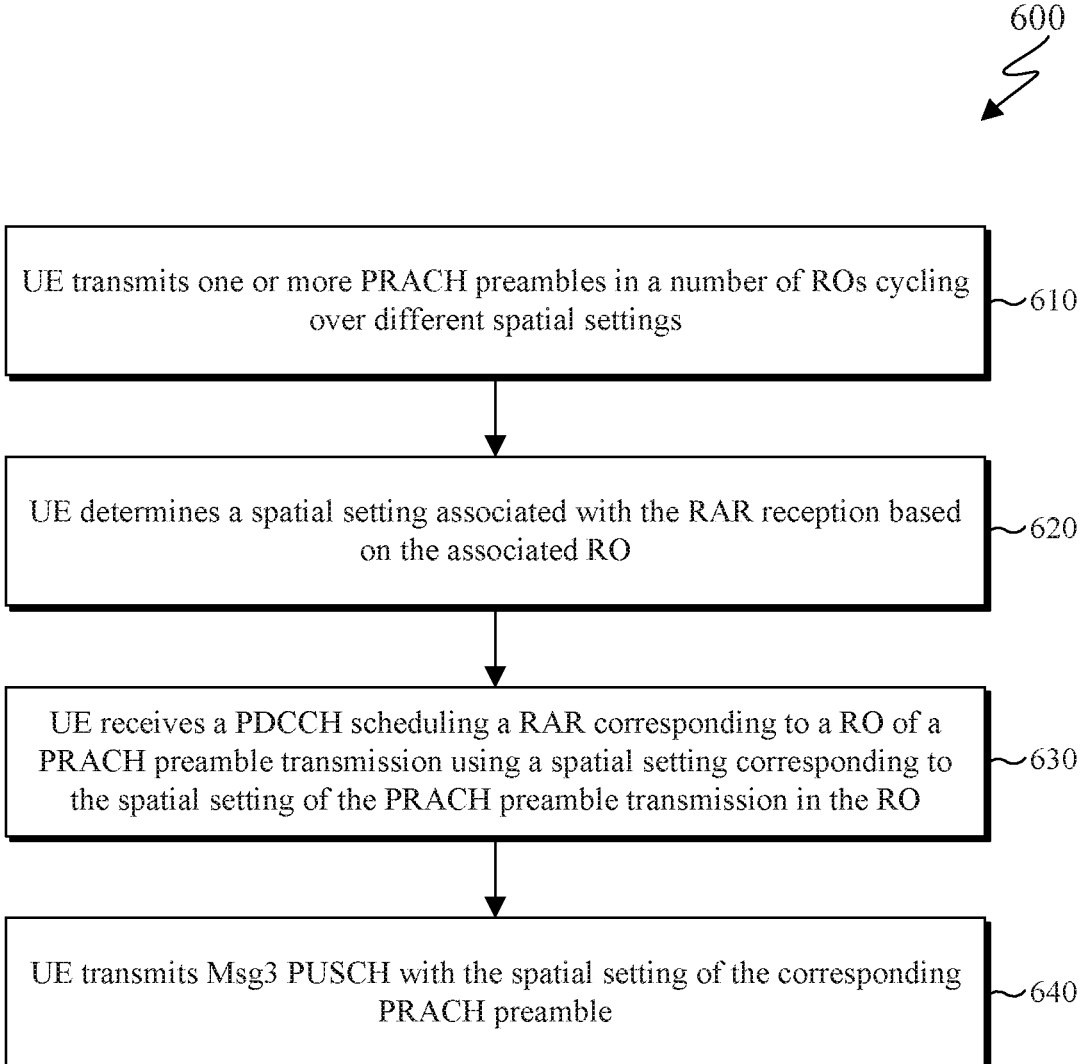

*600*

UE transmits one or more PRACH preambles in a number of ROs cycling over different spatial settings — 610

UE determines a spatial setting associated with the RAR reception based on the associated RO — 620

UE receives a PDCCH scheduling a RAR corresponding to a RO of a PRACH preamble transmission using a spatial setting corresponding to the spatial setting of the PRACH preamble transmission in the RO — 630

UE transmits Msg3 PUSCH with the spatial setting of the corresponding PRACH preamble — 640

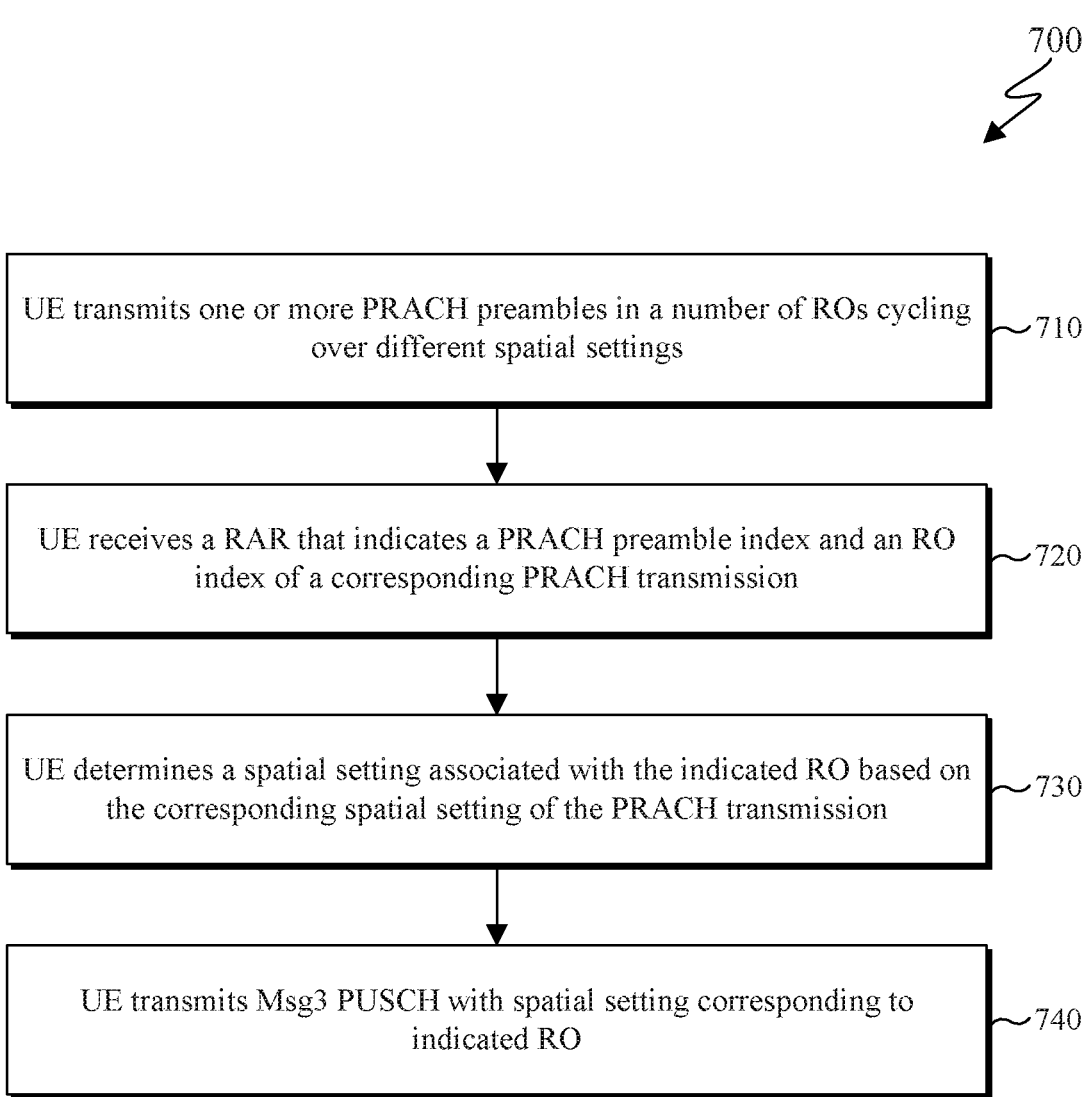

UE transmits one or more PRACH preambles in a number of ROs cycling over different spatial settings ~710

UE receives a RAR that indicates a PRACH preamble index and an RO index of a corresponding PRACH transmission ~720

UE determines a spatial setting associated with the indicated RO based on the corresponding spatial setting of the PRACH transmission ~730

UE transmits Msg3 PUSCH with spatial setting corresponding to indicated RO ~740

FIG. 7

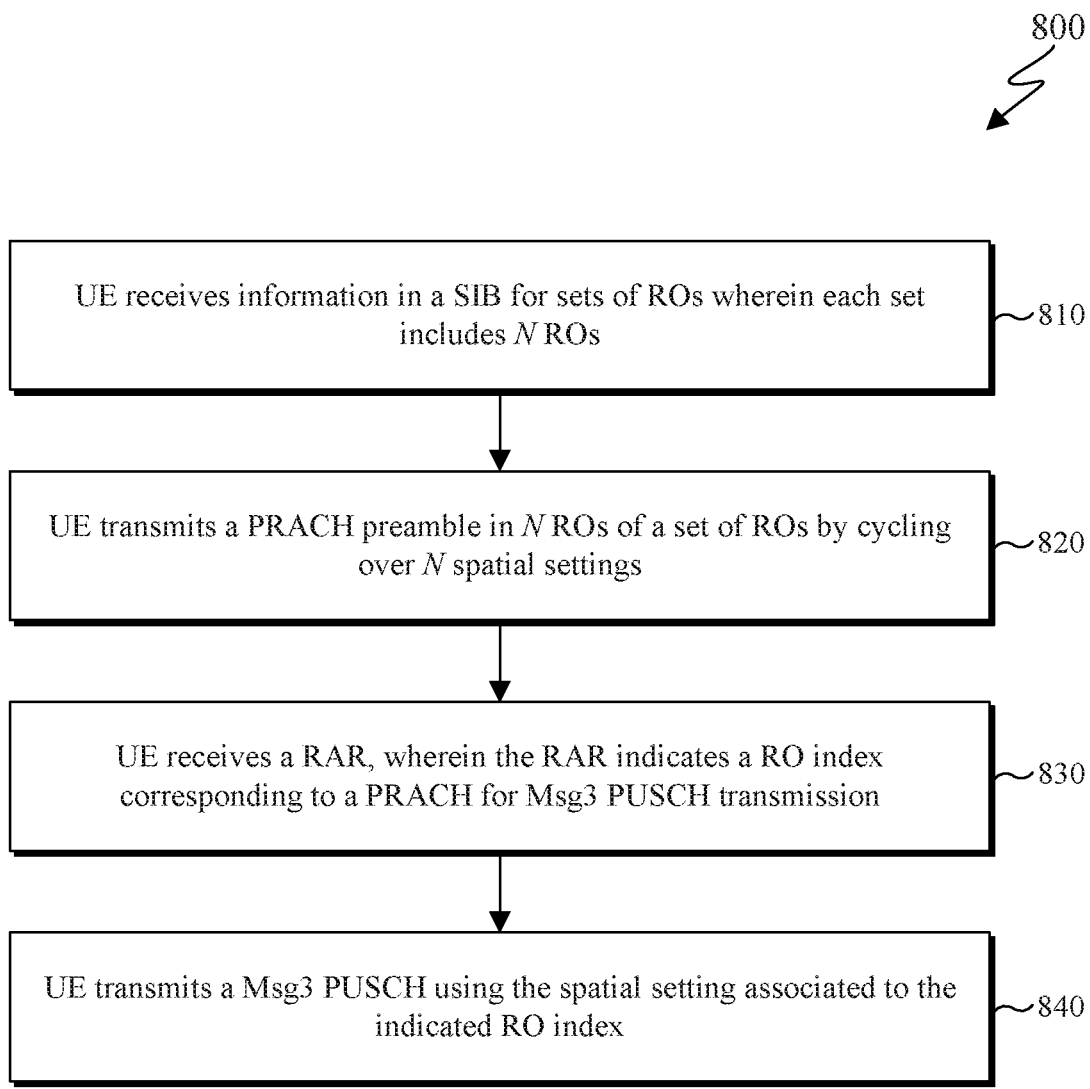

800

UE receives information in a SIB for sets of ROs wherein each set includes $N$ ROs ~810

UE transmits a PRACH preamble in $N$ ROs of a set of ROs by cycling over $N$ spatial settings ~820

UE receives a RAR, wherein the RAR indicates a RO index corresponding to a PRACH for Msg3 PUSCH transmission ~830

UE transmits a Msg3 PUSCH using the spatial setting associated to the indicated RO index ~840

FIG. 8

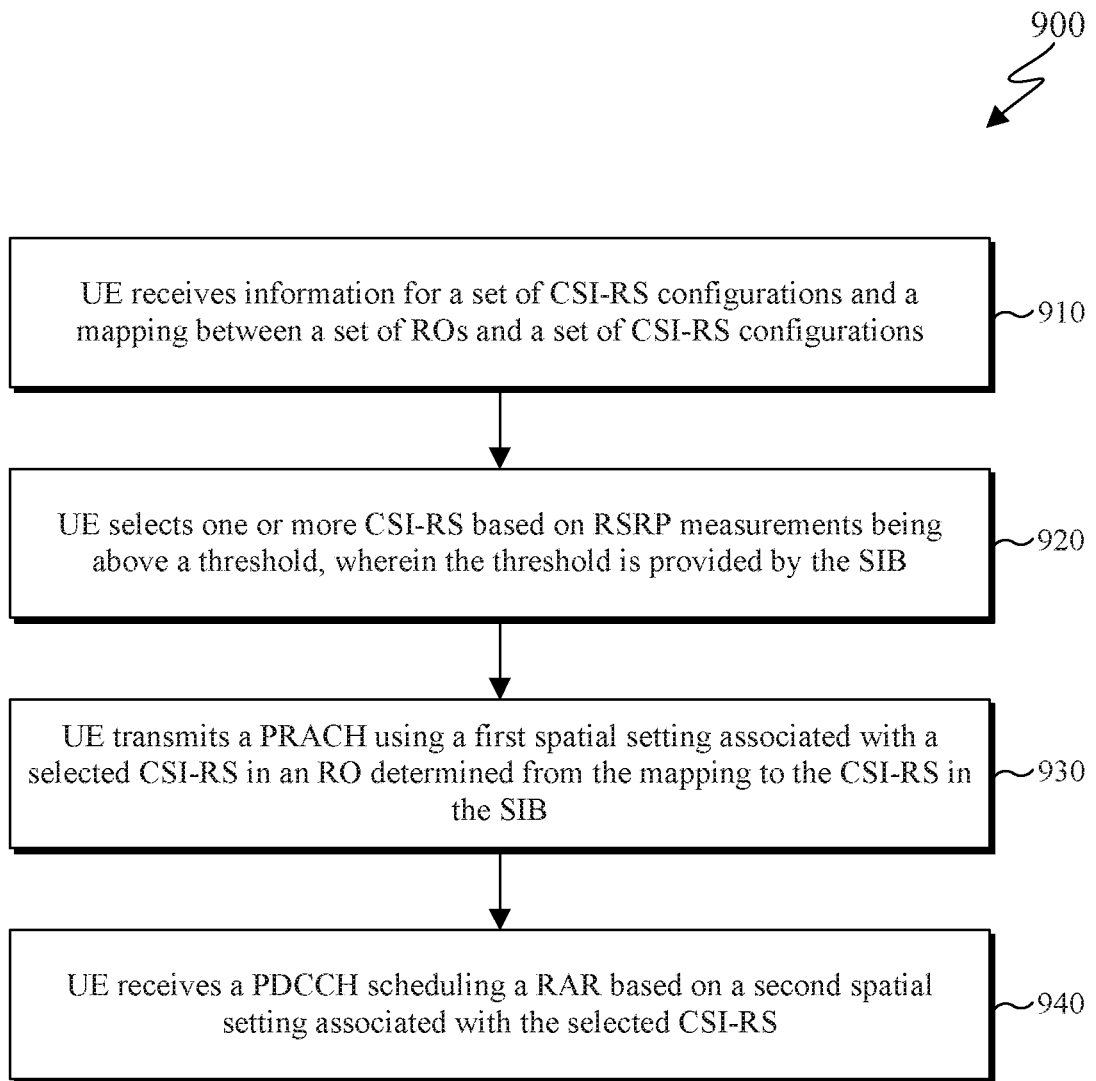

_900_

UE receives information for a set of CSI-RS configurations and a mapping between a set of ROs and a set of CSI-RS configurations ~910

UE selects one or more CSI-RS based on RSRP measurements being above a threshold, wherein the threshold is provided by the SIB ~920

UE transmits a PRACH using a first spatial setting associated with a selected CSI-RS in an RO determined from the mapping to the CSI-RS in the SIB ~930

UE receives a PDCCH scheduling a RAR based on a second spatial setting associated with the selected CSI-RS ~940

FIG. 9

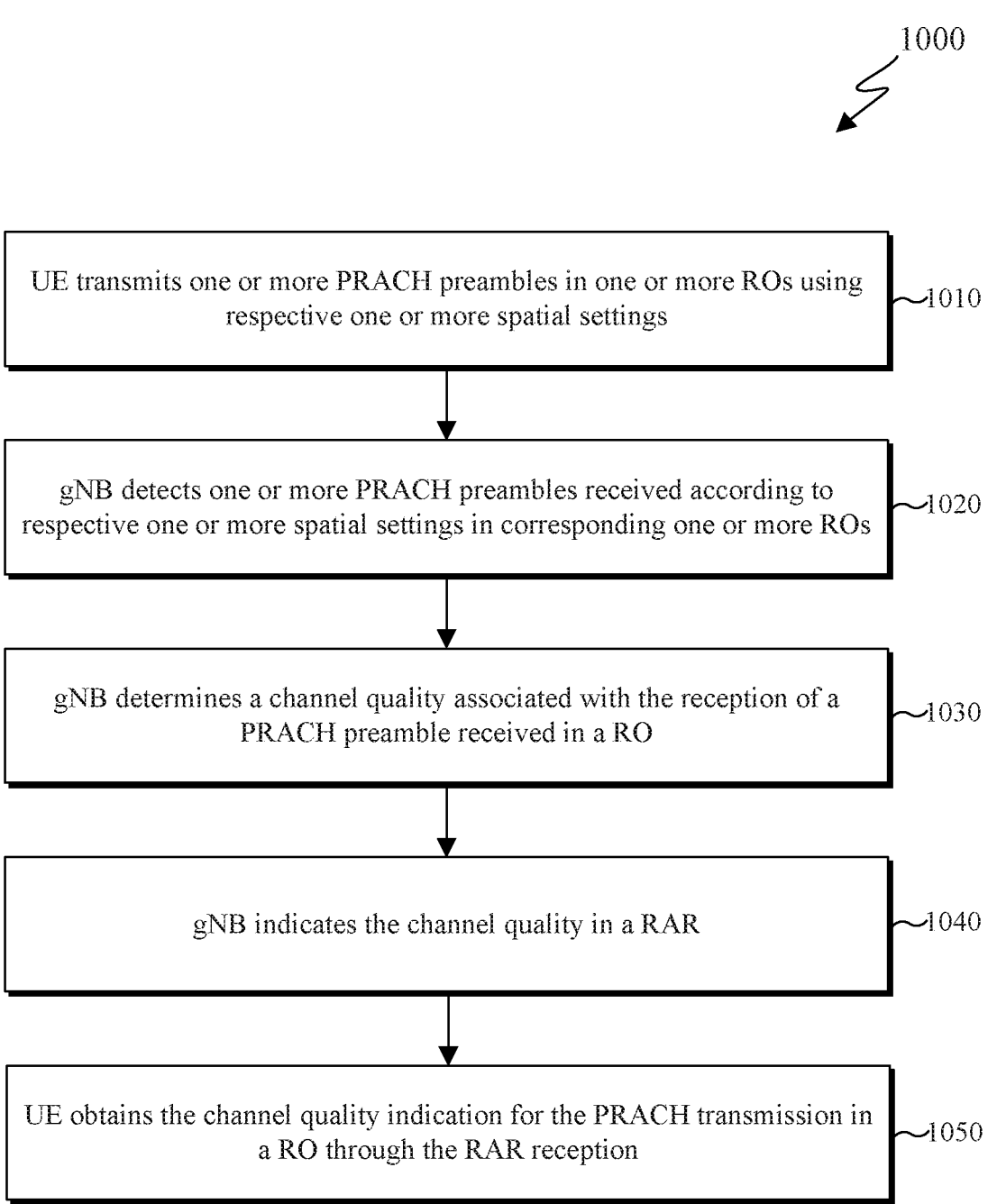

1000

UE transmits one or more PRACH preambles in one or more ROs using respective one or more spatial settings — 1010 gNB detects one or more PRACH preambles received according to respective one or more spatial settings in corresponding one or more ROs — 1020 gNB determines a channel quality associated with the reception of a PRACH preamble received in a RO — 1030 gNB indicates the channel quality in a RAR — 1040

UE obtains the channel quality indication for the PRACH transmission in a RO through the RAR reception — 1050

UE receives a RAR that includes quality indications for spatial settings used for transmission of PRACH preambles　～1310

UE determines spatial setting with largest indicated quality　～1320

UE transmits Msg3 PUSCH using spatial setting with largest indicated quality　～1330

1400

UE receives more than one RAR, wherein each RAR is associated with a PRACH preamble transmitted by the UE ~1410

UE determines a spatial setting for Msg3 PUSCH transmission ~1420

UE transmits Msg3 PUSCH using the determined spatial setting ~1430

UE indicates the PRACH preambles that the UE does not associate with Msg3 PUSCH transmission ~1440

METHOD AND APPARATUS FOR SPATIAL SETTING DETERMINATION DURING A RANDOM ACCESS PROCEDURE

CROSS-REFERENCE TO RELATED APPLICATION AND CLAIM OF PRIORITY

This application is a continuation of U.S. patent application Ser. No. 17/447,564, filed on Sep. 13, 2021, which claims priority under 35 U.S.C. § 119(e) to U.S. Provisional Patent Application No. 63/081,056, filed on Sep. 21, 2020. The above-identified patent applications are hereby incorporated by reference in their entirety.

TECHNICAL FIELD

The present disclosure relates generally to wireless communication systems and, more specifically, the present disclosure relates to determining spatial settings during a random access procedure.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to a spatial setting determination during a random access procedure.

In one embodiment, a user equipment (UE) is provided. The UE includes a processor configured to determine a first physical random access channel (PRACH) preamble for transmission in a first PRACH occasion (RO) using a first spatial setting and a second PRACH preamble for transmission in a second RO using a second spatial setting. The UE further includes a transceiver operably connected to the processor. The transceiver is configured to transmit the first PRACH preamble in the first RO using the first spatial setting; transmit the second PRACH preamble in the second RO using the second spatial setting; and receive a first physical downlink control channel (PDCCH) scheduling a reception of a first physical downlink shared channel (PDSCH) using a third spatial setting associated with the first spatial setting, wherein the first PDSCH provides a first random access response (RAR) message associated with the first PRACH preamble transmission, or a second PDCCH scheduling a reception of a second PDSCH using a fourth spatial setting associated with the second spatial setting, wherein the second PDSCH provides a second RAR message associated with the second PRACH preamble transmission.

In another embodiment, a base station (BS) is provided. The BS includes a processor configured to determine a first PRACH preamble for transmission in a first RO using a first spatial setting, and a second PRACH preamble for transmission in a second RO using a second spatial setting. The BS also includes a transceiver operably connected to the processor. The transceiver is configured to receive the first PRACH preamble in the first RO using the first spatial setting, and the second PRACH preamble in the second RO using the second spatial setting; and transmit: a first PDCCH scheduling a transmission of a first PDSCH using a third spatial setting associated with the first spatial setting, wherein the first PDSCH provides a first RAR message associated with the first PRACH preamble reception, or a second PDCCH scheduling a transmission of a second PDSCH using a fourth spatial setting associated with the second spatial setting, wherein the second PDSCH provides a second RAR message associated with the second PRACH preamble reception.

In yet another embodiment, a method is provided. The method includes determining a first PRACH preamble for transmission in a first RO using a first spatial setting and determining a second PRACH preamble for transmission in a second RO using a second spatial setting. The method further includes transmitting the first PRACH preamble in the first RO using the first spatial setting and transmitting the second PRACH preamble in the second RO using the second spatial setting. The method further includes receiving a first PDCCH scheduling a reception of a first PDSCH using a third spatial setting associated with the first spatial setting, wherein the first PDSCH provides a first RAR message associated with the first PRACH preamble transmission, or a second PDCCH scheduling a reception of a second PDSCH using a fourth spatial setting associated with the second spatial setting, wherein the second PDSCH provides a second RAR message associated with the second PRACH preamble transmission.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6 and 7 illustrate example methods for a UE determining a spatial setting for a Msg3 physical uplink shared channel (PUSCH) transmission according to embodiments of present disclosure;

FIG. 8 illustrates an example method for a UE transmitting a physical random access channel (PRACH) preamble in a set of random access channel occasions (ROs) configured in a system information block (SIB) according to embodiments of present disclosure;

FIG. 9 illustrates an example method for a UE transmitting a physical random access channel (PRACH) preamble in a set of ROs configured in a SIB that provides a set of CSI-RS configurations and a mapping between a set of ROs and a set of CSI-RS configurations according to embodiments of present disclosure;

FIG. 10 illustrates an example method for a gNB to indicate in a random access response (RAR) to a UE a channel quality associated with a reception of a PRACH preamble in a RO according to embodiments of present disclosure;

DETAILED DESCRIPTION

Figure 1:
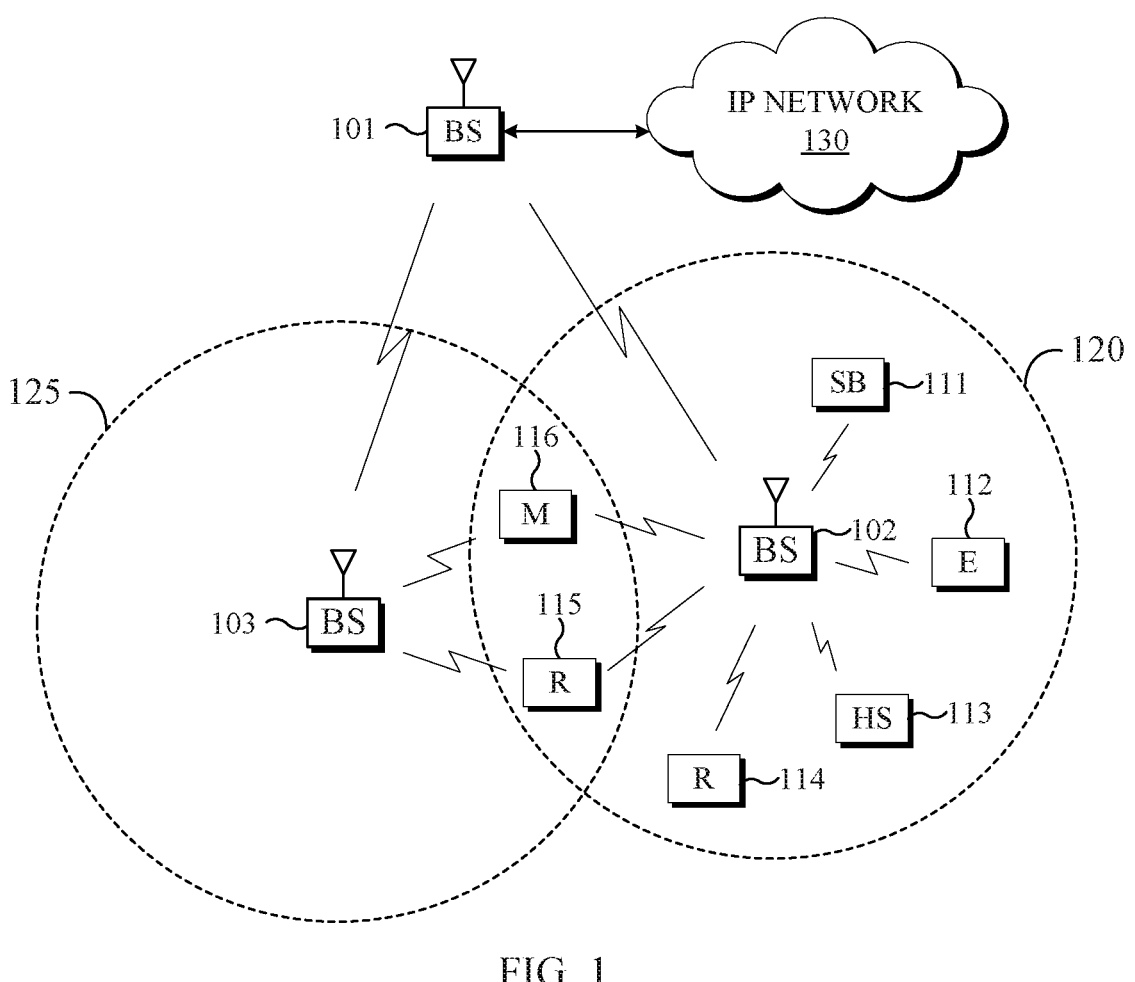
FIG. 1 illustrates an example wireless network according to embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.0.0, "NR; Physical channels and modulation," 3GPP TS 38.212 v16.0.0, "NR; Multiplexing and channel coding," 3GPP TS 38.213 v16.0.0, "NR; Physical layer procedures for control," 3GPP TS 38.214 v16.0.0, "NR; Physical layer procedures for data," 3GPP TS 38.321 v15.8.0, "NR; Medium Access Control (MAC) Protocol Specification," and 3GPP TS 38.331 v15.8.0, "NR; Radio Resource Control (RRC) Protocol Specification."

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
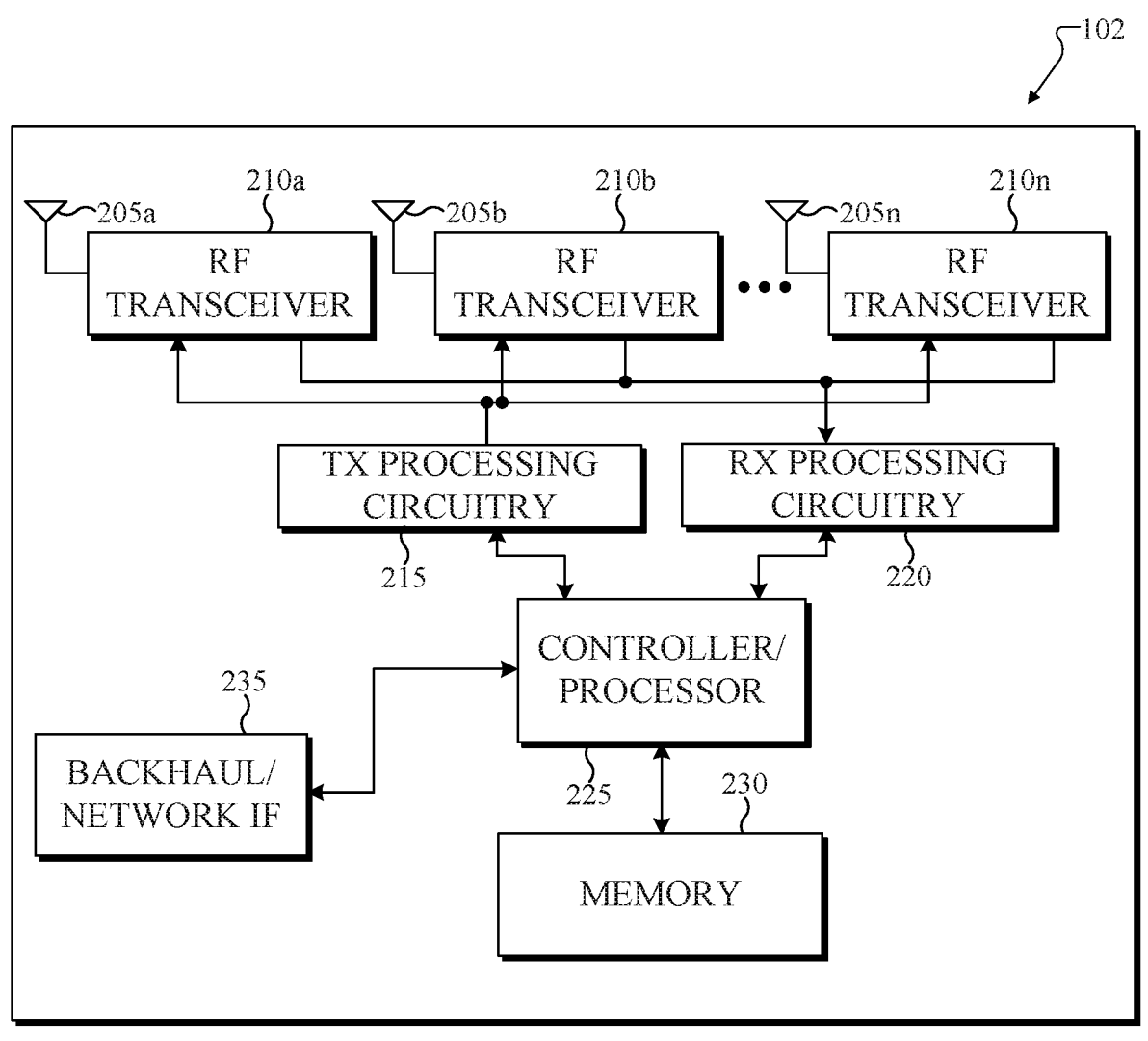
FIG. 2 illustrates an example base station (BS) according to embodiments of the present disclosure.
Figure 3:
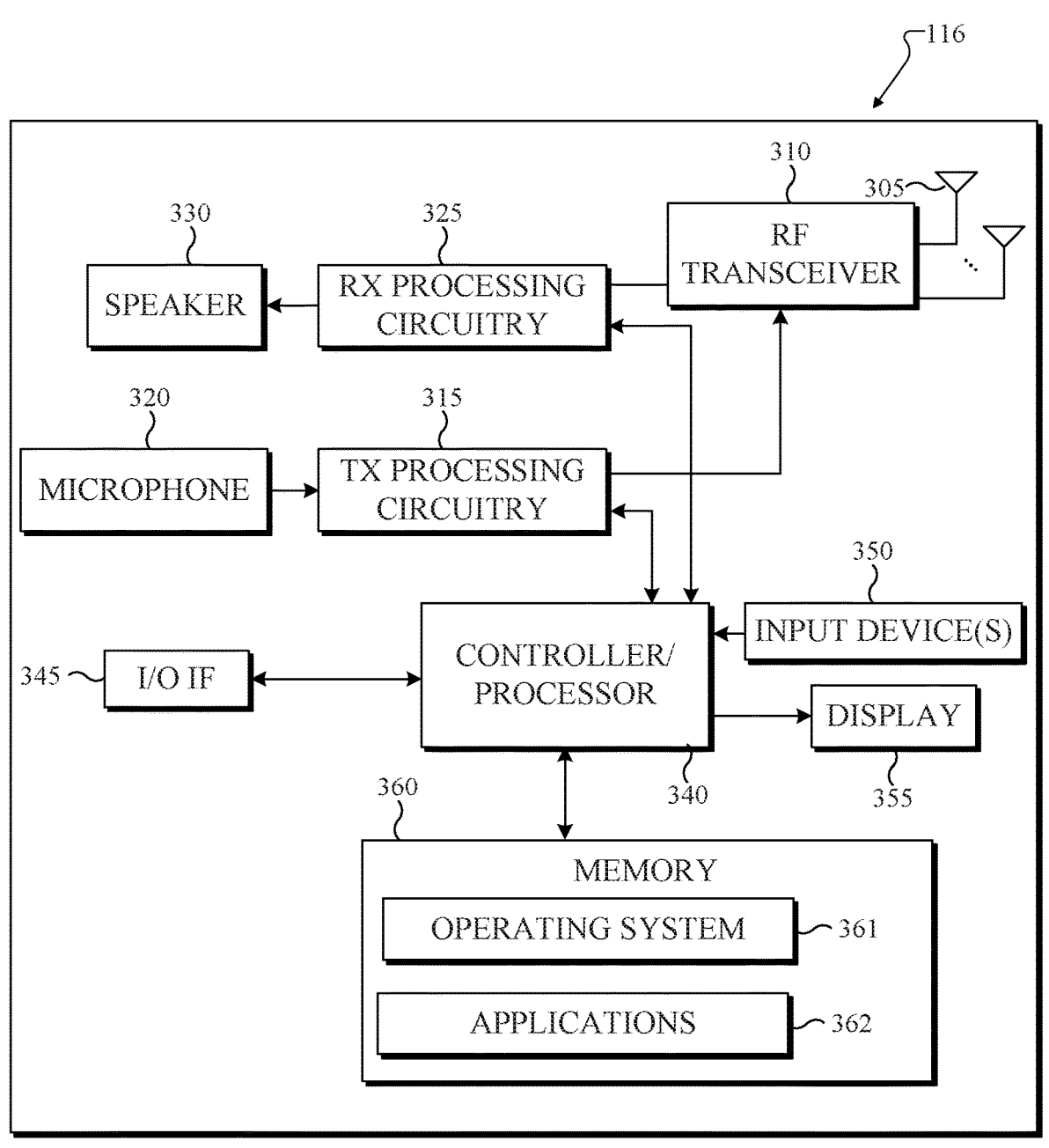
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for spatial setting determination during a random access procedure. In certain embodiments, and one or more of the BSs 101-103 includes circuitry, programing, or a combination thereof for spatial setting determination during a random access procedure.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support determining spatial settings during a random access procedure. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities. For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

In certain embodiments, transmit and receive paths of the BS 102 can support communication with aggregation of frequency division duplexing (FDD) cells and time division duplexing (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of downlink channel signals and the transmission of uplink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figures 4, 5:
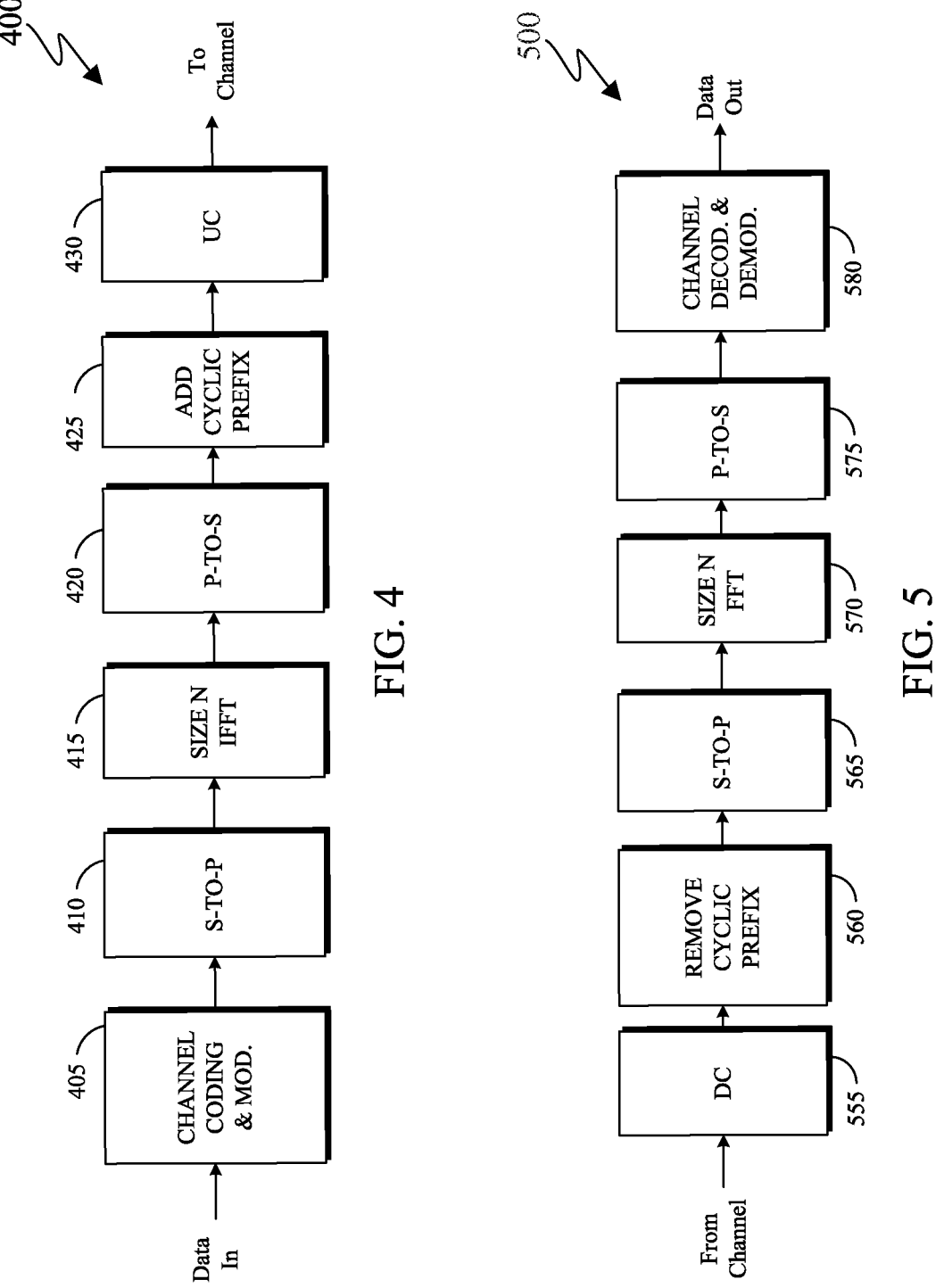
FIGS. 4 and 5 illustrate example wireless transmit and receive paths according to embodiments of present disclosure.

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support spatial setting determination during a random access procedure as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A random access (RA) procedure can be initiated by radio resource control (RRC) for a system information (SI) request if a system information block 1 (SIB1) includes scheduling information for an on-demand SI request, by a medium access control (MAC), or by a Physical Downlink Control Channel (PDCCH) order. The RA procedure can be initiated due to a variety of triggers or purposes. For example, the RA procedure can be initiated for initial access to establish an RRC connection, where a user equipment (UE) transitions from an RRC_IDLE state to an RRC_CONNECTED state, to re-establish an RRC connection after radio link failure (RLF), for an on-demand SI request, or for hand-over. In addition, the RA procedure can be initiated for purposes such as uplink (UL) synchronization, scheduling request (SR), positioning, or link recovery referred to herein as beam failure recovery (BFR).

RA can operate in at least two modes. A first mode is contention-based random access (CBRA) where UEs transmitting to a same serving cell can share same RA resources and, accordingly, there is a possibility of collision among RA attempts from different UEs. A second mode is contention-free random access (CFRA) where a UE has dedicated RA resources that are indicated by a serving gNB and may not be shared with other UEs so that RA collisions can be avoided.

A four-step RA procedure, also known as a Type-1 (L1) random access procedure, includes a transmission of a physical random access channel (PRACH) preamble (Msg1), an attempt to receive a random access response (RAR or Msg2), a transmission of a contention resolution message (Msg3), and an attempt to receive a contention resolution message (Msg4). An alternative RA procedure can include only two steps, referred to herein as two-step RACH or a Type-2 L1 random access procedure. In two step RACH, Msg1 and Msg3 are combined into a MsgA transmission and Msg2 and Msg4 above are combined into a MsgB reception. MsgA combines a PRACH preamble transmission in a RACH occasion (RO) along with a PUSCH transmission in a so-called PUSCH occasion (PO). The mapping between ROs and POs can be one-to-one, many-to-one, or one-to-many.

Embodiments of the present disclosure considers the four-step RACH procedure and the embodiments for determining a spatial setting for a PRACH preamble transmitted in an RO herein described for four-step RACH can generally apply also to determining a spatial setting for a MsgA transmission for a two-step RACH procedure. Descriptions of transmission settings for a Msg3 PUSCH transmission upon reception of a RAR for four-step RACH procedure can apply to a PUSCH transmission upon reception of a RAR indicating a successful decoding of the MsgA PUSCH transmission for the two-step RACH procedure.

This disclosure relates to a RA procedure for a UE to establish RRC connection with a serving gNB wherein the random access procedure includes a transmission of a PRACH from the UE, a RAR reception by the UE in response to the PRACH transmission and, for a contention based random access, a Msg3 PUSCH transmission from the UE for contention resolution. This disclosure also relates to determining a spatial setting for transmission of a PRACH preamble in a RACH occasion (RO) from a UE. This disclosure further relates to determining a spatial setting for transmission of a Msg3 from a UE. Additionally, this disclosure relates to selecting by a UE a RAR from multiple RARs to determine a Msg3 PUSCH transmission. The disclosure also relates to receiving by a UE a channel quality corresponding to a spatial setting used by the UE for a PRACH transmission. The disclosure also relates to indicating cancelled RA procedures by a UE.

During initial cell search, a UE acquires/detects a synchronization signal/physical broadcast channel (SS/PBCH) block transmitted by a serving gNB. The gNB can transmit multiple SS/PBCH blocks with different quasi-collocation properties (beams). The UE typically acquires a SS/PBCH block corresponding to a largest signal to interference and noise ratio (SINR). In case of reciprocal reception/transmission quasi-collocation properties at the UE, the SS/PBCH block that the UE detects has quasi-collocation properties that best match the ones of transmissions from the UE. Then, the UE can transmit PRACH according to the spatial setting that is determined from the detected SS/PBCH block.

Embodiments of the present disclosure take into consideration that a gNB (such as BS 102) transmits a synchronized signal/physical broad channel (SS/PBCH) block with a relatively "wide" beam in order to cover a corresponding wide area on a cell. Typically, there is a coverage imbalance between downlink (DL) receptions and uplink (UL) transmissions due to imbalance in maximum powers than can be used for respective transmissions by a gNB and by a UE. To compensate for such coverage imbalance, the UE (such as the UE 116) can transmit a physical random access channel (PRACH) with a narrower beam including changing the spatial filter of the PRACH transmission when the UE does not detect a random access response (RAR) message addressing the UE in response to a PRACH transmission. The UE can also perform sweeping over multiple spatial filters for a PRACH transmissions in order to cover a larger spatial area. The gNB may be able to detect one or more of the UE transmissions, and based on the configuration of the PRACH transmission, the gNB can transmit one or more RARs to the UE.

When the UE does not receive a RAR the UE may restart the RA procedure by transmitting another PRACH preamble. The UE may receive a RAR because the gNB has not detected a PRACH preamble from the UE. For example, because a corresponding spatial filter used by the UE does not provide sufficiently large SINR. Additionally, the UE may receive a RAR because although the gNB has successfully detected the PRACH preamble from the UE and has transmitted a RAR to the UE, the UE has not received the RAR, for example because a corresponding spatial filter used by the gNB does not provide sufficiently large SINR.

When a RAR is successfully received by the UE, the UE transmits a Msg3. When the Msg3 is not correctly received by the gNB, the UE may have transmitted Msg3 using a spatial filter that does not provide sufficiently large SINR. The gNB can schedule a Msg3 retransmission from the UE, but the Msg3 retransmission from the UE would typically need to be with a spatial filter that provides sufficiently large SINR in order to be correctly received by the gNB.

Accordingly, embodiments of the present disclosure take into consideration that there is a need to enable a UE to apply a spatial filter to a Msg3 transmission that results in a sufficiently large SINR at a serving gNB and to provide means for the UE to determine such spatial filter.

Embodiments of the present disclosure take into consideration that there is also a need to provide means for a gNB to determine cancelled RA procedures by the UE. Finally, there is another need to provide signaling mechanisms for a gNB to indicate a quality for a spatial filter to a UE and for the UE to indicate cancelled RA procedures to the gNB.

Embodiments of the present disclosure describe determining a spatial filter for transmission of a PUSCH Msg3 to a serving gNB by a UE. The following examples and embodiments, describe determining a spatial filter for transmission of a PUSCH Msg3 to a serving gNB by a UE.

A gNB (such as the BS 102) can detect several PRACH preambles from one or more UEs (such as the UE 116) and transmit corresponding RARs through one or more physical downlink shared channels (PDSCHs). For contention based random access, such as when a UE performs initial access to a cell after detecting a SS/PBCH block, when a gNB detects a preamble, the gNB cannot identify the UE that transmitted the preamble. When a gNB detects a PRACH preamble, the gNB transmits a RAR and a UE attempts to detect a DCI format with CRC scrambled by a corresponding RA-radio network temporary identifier (RNTI) during a window controlled by higher layers, wherein the RA-RNTI is a function of parameters related to the PRACH transmission, such as the time and frequency of a PRACH Occasion (RO) used for the PRACH transmission and can be determined by the UE. For example, the RA-RNTI associated with the PRACH occasion corresponding to the RAR, is described in Equation (1)

$$RA\text{-}RNTI=1+s\_id+14{\times}t\_id+14{\times}80{\times}f\_id+14{\times}80{\times}8{\times}\\ul\_carrier\_id \qquad (1)$$

Here, the expression s_id is the index of the first OFDM symbol of the PRACH occasion (0≤s_id<14). The expression t_id is the index of the first slot of the PRACH occasion in a system frame (0≤t_id<80), where the subcarrier spacing (SCS) to determine t_id is based on the value of SCS configuration μ. The expression f_id is the index of the PRACH occasion in the frequency domain (0≤f_id<8). The expression ul_carrier_id is the UL carrier used for PRACH preamble transmission. A RAR includes scheduling information that a UE can use to transmit a Msg3 using a same or different spatial filter than the one the UE used to receive the RAR.

In order to enhance a detection probability of a PRACH preamble at a gNB, a UE (such as the UE 116) can transmit different preambles using different spatial filters in different PRACH occasions (ROs). For example, a UE can transmit four different PRACH preambles in RO_1, RO_2, RO_3 and RO_4, respectively, using four corresponding spatial settings. It is also possible that the UE transmits a same PRACH preamble repeated a number of times N over N ROs by cycling over the different spatial setting per RO. For example, starting from a first RO_1, the UE transmits a same preamble in ROs with time index modN for N repetitions with cycling of a spatial setting wherein mod( ) is the modulo function.

When a UE transmits different PRACH preambles or repeats a same PRACH preamble in a number of ROs, by cycling over a number of different spatial settings, a gNB can detect from none to all of the transmitted preambles by the UE. In response to a successful reception of PRACH preambles, the gNB can indicate reception of PRACH preambles to the UE that transmitted the preambles and, depending on the configuration of the PRACH transmissions and configuration of the RAR, the gNB can transmit a single RAR or multiple RARs in response to the PRACH transmissions in different ROs over different spatial settings.

Embodiments of the present disclosure describe a 1 to N mapping of RAR to ROs. The following examples and embodiments, such as those described in FIGS. 6 and 7 describe the 1 to N mapping of RAR to ROs.

A gNB (such as the NS 102) can configure a UE (such as the UE 116) to transmit PRACH preambles in a set of ROs by cycling a spatial setting over a number of spatial settings. For example, the UE transmits four PRACH preambles in RO_1, RO_2, RO_3 and RO_4, respectively, using four corresponding spatial settings. The UE can randomly select all four PRACH preambles or can randomly select the first PRACH preamble and determine the remaining PRACH preambles to be the ones with consecutive indexes to the first PRACH preamble. For example, the gNB can signal a separate set of PRACH preambles for UEs using different spatial settings for repetitions of a PRACH transmission and, for four repetitions of a PRACH preamble transmission with four spatial settings, the gNB can signal separate quadruples of preambles. Alternatively, a UE transmits a same PRACH preamble in RO_1, RO_2, RO_3 and RO_4, using four corresponding spatial settings. Upon receiving at least one of the PRACH preambles, the gNB can send a RAR to the UE. Each RAR message includes information for an associated PRACH preamble index and, when a UE transmits a same PRACH preambles in different ROs using different spatial settings, the RAR can also include information for associated RO indexes. If the gNB receives a single PRACH preamble, the gNB transmits a RAR that includes scheduling information for Msg3 transmission using the spatial setting used for transmission of the detected preamble in the corresponding RO. If the gNB receives multiple PRACH preambles, the gNB can select one of the received PRACH preambles and transmit a RAR that includes scheduling information for Msg3 transmission using the spatial setting used by the selected PRACH preamble for transmission in the corresponding RO or the gNB can transmit RARs for each of the received/detected PRACH preambles and schedule multiple corresponding PRACH transmissions.

Alternatively, regardless of whether a gNB receives a single PRACH preamble or multiple PRACH preambles, the gNB can transmit a RAR with a relatively "wide" beam, for example using the beam of the associated SS/PBCH block transmission. The gNB can indicate scheduling information and an RO index corresponding to the received PRACH preamble if a single PRACH preamble is received or corresponding to the selected PRACH preamble among the received PRACH preambles. If different preambles are used in different ROs and each RO is uniquely associated with a preamble from a UE, the RAR does not need to identify the RO and indication of the PRACH preamble index suffices.

FIGS. 6 and 7 illustrate example methods for a UE determining a spatial setting for a Msg3 physical uplink shared channel (PUSCH) transmission according to embodiments of present disclosure. FIG. 6 illustrates the method 600 for a UE to determine a spatial setting for a Msg3 PUSCH transmission when the UE receives a RAR with the spatial setting corresponding to a PRACH preamble the UE transmitted in a RO. FIG. 7 illustrates the method 700 for a UE to determine a spatial setting for a Msg3 PUSCH transmission when the UE receives a RAR with a wide beam with respect to the beam/spatial setting of the PRACH preamble transmission by the UE in a RO. The steps of the method 600 and method 700 can be performed by any of the UEs 111-116 of FIG. 1, such as the UE 116 of FIG. 3 and a complementarity procedure may be preformed by a BS such as BS 102. The method 600 of FIG. 6 and the method 700 of FIG. 7 are for illustration only and other embodiments can be used without departing from the scope of the present disclosure.

As illustrated in the method 600 of FIG. 6, a UE transmits one or more PRACH preambles in a number of ROs cycling over a number of spatial settings (step 610). For example, the UE transmits N PRACH preambles using M ROs, wherein, when N>M, first ⌈N/M⌉·(N−⌊N/M⌋·M) PRACH preambles are transmitted in corresponding first N−⌊N/M⌋·M ROs from the M ROs and last N−⌈N/M⌉·(N−⌊N/M⌋·M) PRACH preambles are transmitted in corresponding last M−N+⌊N/M⌋·M ROs. Similarly, when N<M, first ⌈M/N⌉·(M−⌊M/N⌋·N) PRACH preambles are transmitted in corresponding first M−⌊M/N⌋·N ROs from the N ROs and last M−⌈M/N⌉·(M−⌊M/N⌋·N) PRACH preambles are transmitted in corresponding last N−M+⌊M/N⌋·N ROs.

In step 620, the UE determines a spatial setting for RAR reception to correspond to a spatial setting used for PRACH preamble transmission on an RO associated with the RAR reception. In step 630, the UE receives a PDCCH scheduling a RAR corresponding to a RO of a PRACH preamble transmission using a spatial setting corresponding to the spatial setting of the PRACH preamble transmission in the RO, wherein the spatial setting used for reception of the PDCCH scheduling the PDSCH that provides the RAR is same as the spatial setting for the PDSCH reception. For example, a first spatial setting for the PRACH preamble transmission can be determined based on a second spatial setting for a CSI-RS reception and the UE receives the PDCCH scheduling a RAR associated with the PRACH preamble transmission using the second spatial setting. In step 640, the UE transmits Msg3 PUSCH with the spatial setting of the corresponding PRACH preamble.

As illustrated in the method 700 of FIG. 7, a UE transmits one or more PRACH preambles in a number of ROs cycling over a number of spatial settings (step 710). In step 720, the UE receives a RAR, for example using a wide beam, wherein the RAR indicates a PRACH preamble index and an RO index of a corresponding PRACH transmission. In step 730, the UE determines a spatial setting associated with the indicated RO based on the corresponding spatial setting of the PRACH transmission. In step 740, the UE transmits Msg3 PUSCH with the spatial setting corresponding to the indicated RO.

Although FIG. 6 illustrates the method 600 and the FIG. 7 illustrates the method 700 various changes may be made to FIGS. 6 and 7. For example, while the method 600 of FIG. 6 is shown as a series of steps, various steps could overlap, occur in parallel, occur in a different order, or occur multiple times. In another example, steps may be omitted or replaced by other steps. For example, steps of the method 600 can be executed in a different order.

The following examples and embodiments, describe in determining an RO index indicated by a RAR.

A gNB (such as the BS 102) can indicate a RO associated with a detected PRACH preamble in a RAR. Here the gNB transmits the RAR in response to a received PRACH preamble in a RO or in response to receiving multiple PRACH preambles in multiple ROs. Unlike the case that a UE receives a RAR in response to a single PRACH transmission, in case a gNB detects multiple PRACH preambles in multiple ROs, the gNB can select a RO among the multiple ROs to indicate a corresponding PRACH preamble detection in the RAR. For example, a UE can transmit a same PRACH preamble in each of the multiple ROs. The indication can be a field in the RAR. For example, a 2-bit field can be used to indicate one of the ROs used by the UE to transmit a PRACH preamble in 4 ROs by cycling over 4 different spatial settings. The 2 bits in RAR can be 2 reserved bits or other bits can be repurposed. It is also possible that an 8-bit field is used to indicate the RO index. It is also possible that the RO index is indicated by the RA-RNTI. For example, the value of RA-RNTI can be used for determining the position of monitoring occasion for each UE.

In certain embodiments, when a UE transmits a same or different preamble over M ROs, and the gNB detects at least a preamble in an RO, the gNB responds with a single RAR.

For example, the RA-RNTI of the corresponding RAR is determined based on an RO within the set of M ROs, wherein the determined RO is specified by system specification or configured by the network. For example, the RO can be a first RO in the set of M ROs, or a last RO in the set of M ROs, or any other RO in the set of M ROs. A field in the RAR can indicate to the UE, the RO corresponding to the best preamble-receive signal quality at the gNB. Alternatively, if a PRACH preamble is uniquely associated with an RO, a separate indication of the RO in the RAR is not needed and the UE can identify the RO based on the indicated PRACH preamble.

For another example, the RA-RNTI of the corresponding RAR is determined based on the RO in which the gNB detected a PRACH preamble with a best signal quality. A UE can determine the RO of the best preamble-receive signal quality after determining the RA-RNTI of the RAR containing the PRACH preamble index transmitted by the UE in the corresponding RO. The UE attempts to detect a RAR for each of the ROs where the UE transmitted an RA preamble.

For yet another example (which can be used with the previous two examples), the RA-RNTI uses a set of RNTI values that is different from the set of RNTI values used for NR release 15 and NR release 16 where a RAR is associated with a single PRACH preamble transmission and is not associated with multiple repetitions of a PRACH preamble transmission.

The following examples and embodiments such as those of FIG. 8, describe a configuration of RO indices in SIB.

A gNB (such as the BS 102) can configure, through a SIB, RO indices that can be used by UEs (such as the UE 116) to transmit PRACH in sets of N ROs. When a UE selects a set of N ROs, the UE transmits PRACH preambles in the N ROs before the UE receives a RAR. Different sets of ROs can have a same or different number of ROs. The RO indices in a set of ROs can be sequential or intermittent. For example, a gNB can indicate that ROs with indices from 0 to M−1 can be used in sets of N ROs for the transmission of PRACH preambles. The UE can transmit N PRACH preambles in the N ROs cycling over N spatial settings wherein, for example, the UE can determine the spatial settings based on receptions of reference signals, such as CSI-RS, from the gNB.

Alternatively, the UE can transmit a same PRACH preamble in the N ROs cycling over N spatial settings. It is also possible that a UE is configured to use multiple sets of ROs, wherein the RO indices in two sets of ROs may have sequential or non-sequential indices. For example, a UE can use S sets of ROs and transmit PRACH with different spatial settings in different sets of ROs and transmit PRACH with a same spatial setting in the ROs within a set of ROs, or a UE can transmit PRACH with different spatial settings in the ROs within a set and repeat the same pattern of PRACH transmissions with different spatial settings in the other sets. It is also possible that the SIB indicates a set of CSI-RS configurations and a mapping between the set of ROs and the set of CSI-RS configurations. When a gNB configures a UE for PRACH transmission in multiple sets of ROs, the UE would transmit the PRACH preambles in all ROs in the S sets of ROs before the UE receives a RAR.

A gNB can indicate in a SIB, or it can be predetermined in a system operation, that a UE transmits a same PRACH preamble in the multiple ROs. For example, when a UE selects a set of N ROs from the partition of ROs, the UE transmits a same PRACH preamble cycling over N spatial settings in the N ROs.

A gNB can configure in a SIB a partition of Ros. The ROs in a set of N ROs can be used by a UE to transmit multiple PRACH preambles while other ROs can be used by a UE to transmit a single PRACH preamble before a UE receives a RAR in response to the PRACH preamble transmissions.

A gNB can also configure in a SIB a partition of PRACH preambles that a UE can use for transmission in a set of ROs by cycling over different spatial settings and PRACH preambles that a UE can use for transmission in a single RO before the UE receives a corresponding RAR.

A gNB can also configure in a SIB a set of CSI-RS configurations and a mapping between a set of ROs and a set of CSI-RS configurations. A UE can select one or more CSI-RS, for example based on RSRP measurements being larger than a threshold, wherein the SIB configures the threshold. The UE can determine spatial settings to transmit PRACH in the corresponding ROs configured by the SIB based on corresponding spatial settings of the one or more CSI-RS.

FIG. 8 illustrates an example method 800 for a UE transmitting a PRACH preamble in a set of ROs configured in a system information block (SIB) according to embodiments of present disclosure. The steps of the method 800 can be performed by any of the UEs 111-116 of FIG. 1, such as the UE 116 of FIG. 3 and a complementarity procedure may be performed by a BS such as BS 102. The method 800 of FIG. 8 is for illustration only and other embodiments can be used without departing from the scope of the present disclosure.

In step 810, a UE receives information in a SIB for sets of ROs wherein each set includes N ROs. In step 820, the UE transmits a PRACH preamble in N ROs from a set of ROs by cycling over N spatial settings. In step 830, the UE receives a RAR, wherein the RAR indicates, explicitly or implicitly, a RO index corresponding to a PRACH for Msg3 PUSCH transmission. Implicit indication can be through an indication of a PRACH preamble index when there is a one-to-one mapping among PRACH preamble indexes and RO indexes. In step 640, the UE transmits a Msg3 PUSCH using the spatial setting associated to the indicated RO index.

Although FIG. 8 illustrates the method 800 various changes may be made to FIG. 8. For example, while the method 800 of FIG. 8 is shown as a series of steps, various steps could overlap, occur in parallel, occur in a different order, or occur multiple times. In another example, steps may be omitted or replaced by other steps. For example, steps of the method 800 can be executed in a different order.

FIG. 9 illustrates an example method 900 for a UE transmitting a PRACH preamble in a set of ROs configured in a system information block (SIB) that provides a set of CSI-RS configurations and a mapping between a set of ROs and a set of CSI-RS configurations according to embodiments of present disclosure. The steps of the method 900 can be performed by any of the UEs 111-116 of FIG. 1, such as the UE 116 of FIG. 3 and a complementarity procedure may be performed by a BS such as BS 102. The method 900 of FIG. 9 is for illustration only and other embodiments can be used without departing from the scope of the present disclosure.

In step 910, a UE receives information in a SIB, such as a SIB1, for a set of CSI-RS configurations and a mapping between a set of ROs and a set of CSI-RS configurations. In step 920, the UE selects one or more CSI-RS based on RSRP measurements being above a threshold, wherein the threshold is provided by the SIB. In step 930, the UE transmits a PRACH using a first spatial setting associated with the selected CSI-RS in the RO determined from the mapping to the CSI-RS. In step 940, the UE receives a PDCCH scheduling a RAR based on a second spatial setting corresponding to the selected CSI-RS. It is also possible that the SIB configures a maximum number of selected CSI-RS and then the UE selects up to the maximum number of CSI-RS based on an ascending order of respective RSRPs that are above the threshold. It is also possible that none of the RSRPs are above the threshold and then the UE receives the PDCCH scheduling the RAR based on a spatial setting of a cell-defining SS/PBCH block that the UE detected prior to reception of SIBs.

Although FIG. 9 illustrates the method 900 various changes may be made to FIG. 9. For example, while the method 900 of FIG. 9 is shown as a series of steps, various steps could overlap, occur in parallel, occur in a different order, or occur multiple times. In another example, steps may be omitted or replaced by other steps. For example, steps of the method 900 can be executed in a different order.

In certain embodiments, PRACH preambles and ROs can be configured. For example, a gNB can configure, through a SIB, sets of PRACH preambles wherein each set includes N preambles and each preamble can be part of only one set, sets of ROs wherein each set includes N ROs and each RO can be part of only one set, and a mapping for pairs of a preamble set and a RO set.

A 1-to-1 mapping of RAR to ROs can be performed. For example, a gNB (such as the BS 102) can configure a UE (such as the UE 116) to transmit PRACH preambles in a set of ROs. For example, a UE (such as the UE 116) transmits four PRACH preambles in RO_1, RO_2, RO_3 and RO_4 using four spatial settings, respectively, and expects reception of at most four RARs. Upon detecting PRACH preambles, the gNB transmits a first RAR using the spatial setting associated with the first RO, a second RAR using the spatial setting associated with the second RO, and so on. The UE can receive a RAR using the spatial setting associated with a corresponding RO and transmit a Msg3 PUSCH using the spatial setting the UE used for the corresponding PRACH transmission. Alternatively, the UE can receive multiple RARs corresponding to the transmissions of the PRACH preambles in the different ROs, select one RAR, and transmit a Msg3 PUSCH with the spatial setting of the PRACH preamble transmission in the corresponding RO corresponding to the selected RAR.

The following examples and embodiments, describe selecting a RAR among multiple received RARs.

Upon transmission of PRACH preambles, a UE can receive one or more RARs. Here, PRACH preambles can use different spatial settings in different ROs and can use same or different PRACH preambles in different ROs. When a UE receives multiple RARs, a UE can determine a channel quality for RAR selection to determine a subsequent Msg3 PUSCH transmission.

For example, a UE can determine a channel quality for RAR selection based on an estimated path loss associated to a RAR, for example through measurements based on a CSI-RS associated with the RAR. A UE can select a RAR corresponding to a PUSCH Msg3 transmission with the lowest path loss estimate.

For another example, a UE can determine a channel quality for RAR selection based on the "TPC command for PUSCH" field of a RAR grant in addition to the path-loss estimate. A UE can select a RAR corresponding to a PUSCH Msg3 transmission with a lower transmit power.

For another example, a UE can determine a channel quality for RAR selection based on an "MCS" field of a RAR grant. A UE can select a RAR corresponding to a PUSCH Msg3 with a larger MCS index.

For yet another example, a UE can determine a channel quality for RAR selection based on the "TPC command for PUSCH" field and the "MCS" field of a RAR grant.

The following examples and embodiments such as those in FIGS. 10-13, describe signaling channel quality.

Figure 11:
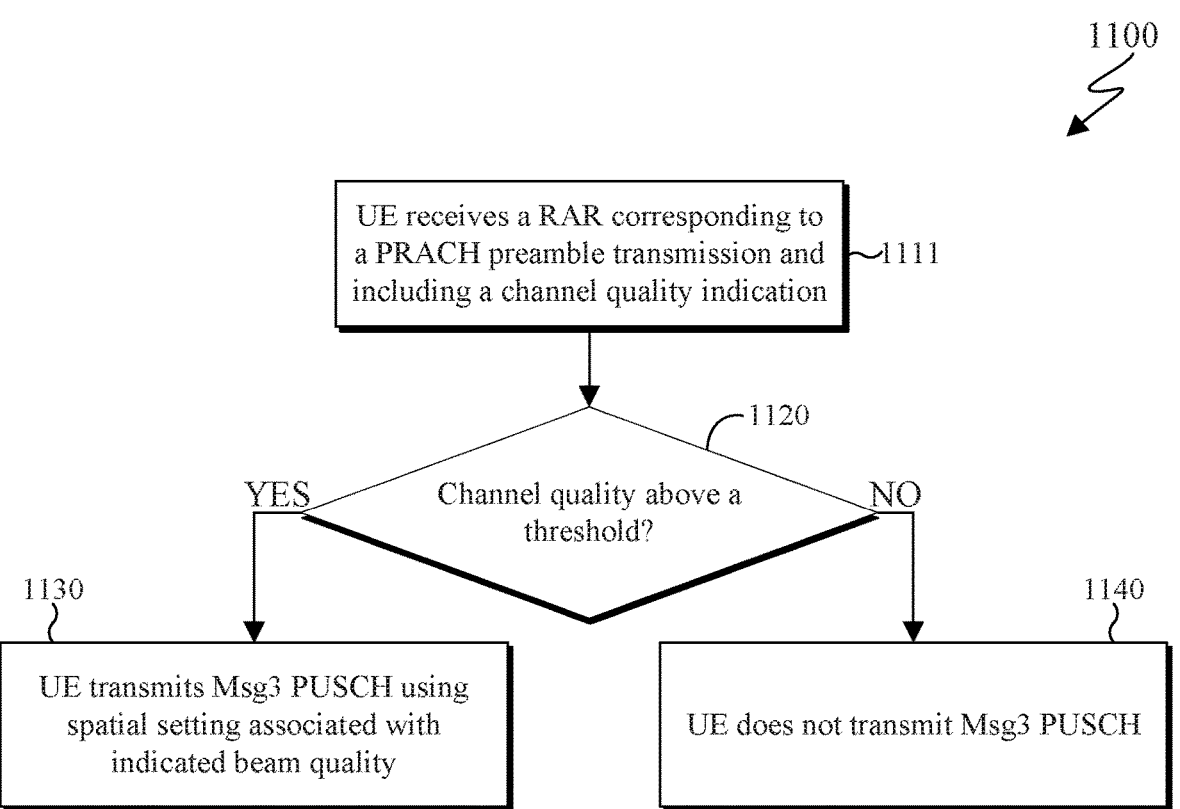
FIG. 11 illustrates an example method for a UE receiving in a RAR a channel quality indication associated with a spatial setting used in PRACH transmission in a RO from the UE according to embodiments of present disclosure.
Figure 12:
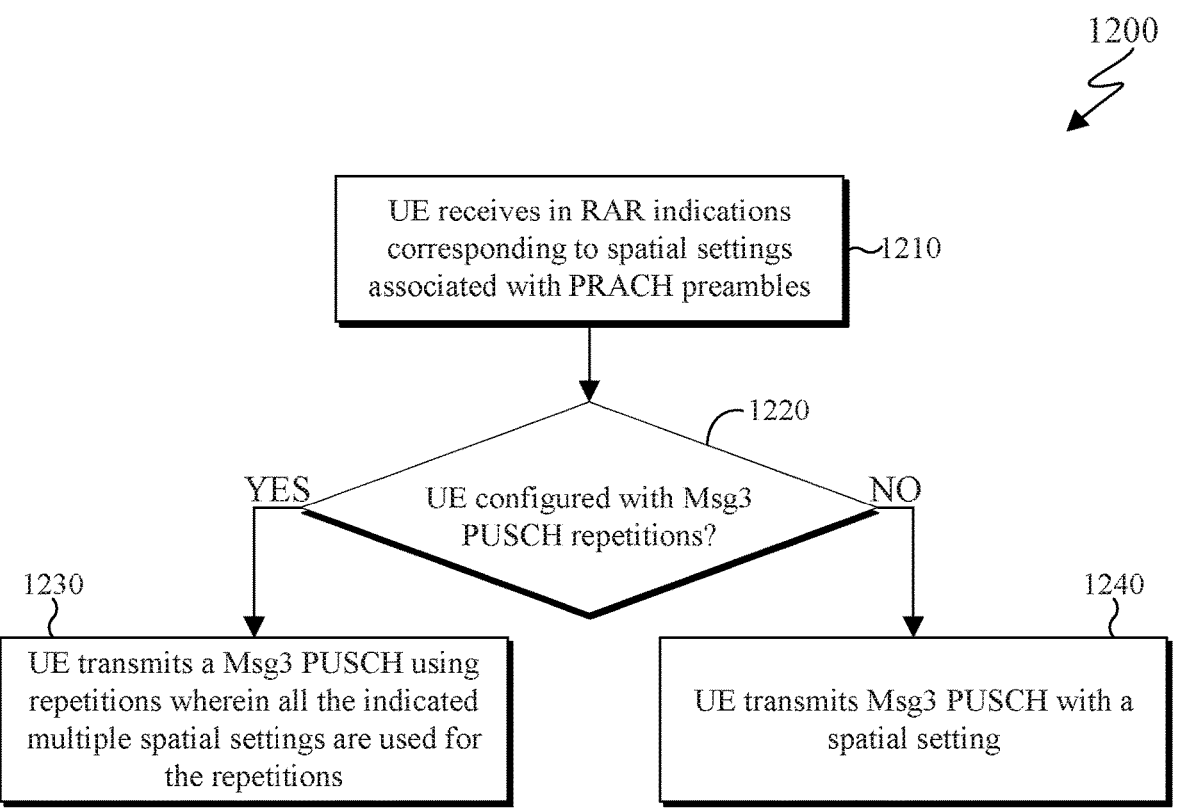
FIG. 12 illustrates an example method for a UE determining spatial settings for a Msg3 transmission based on an indication in a RAR for channel quality of spatial settings according to embodiments of present disclosure.
Figure 13:
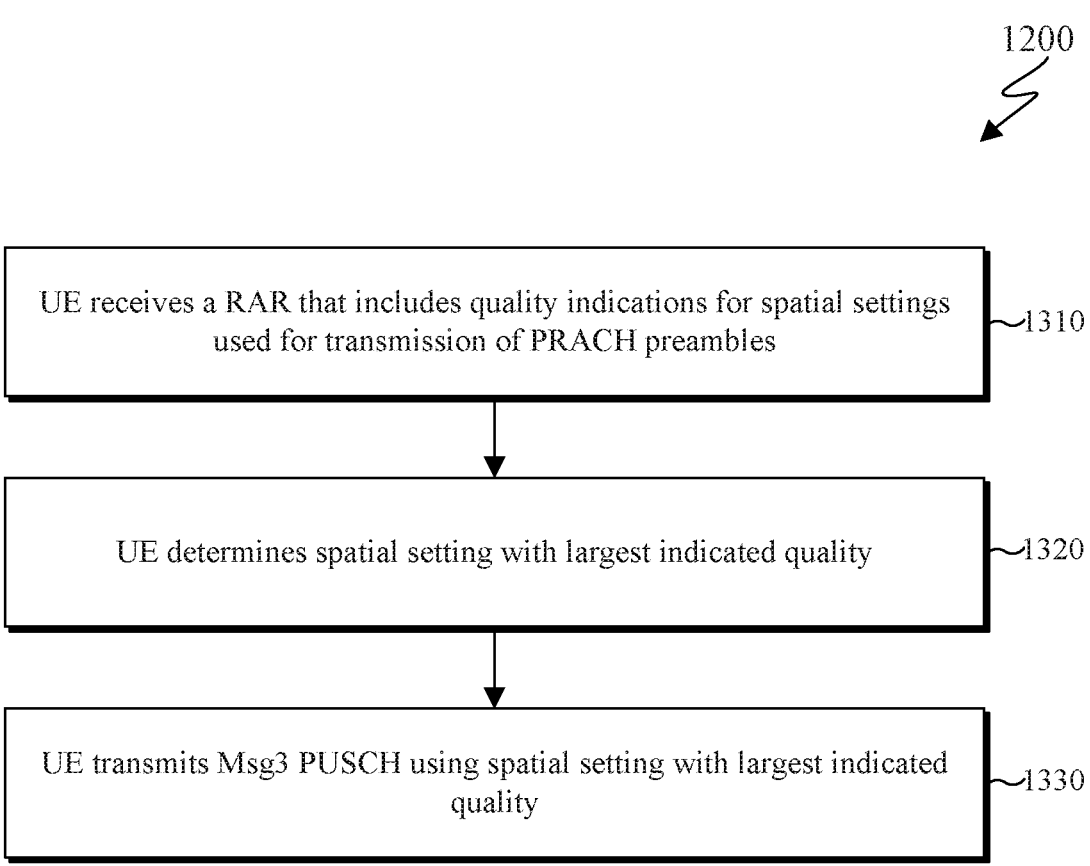
FIG. 13 illustrates an example method for Msg3 PUSCH transmission form a UE receiving channel quality indications in a RAR associated with a PRACH transmission in ROs using corresponding spatial settings according to embodiments of present disclosure.

FIG. 10 illustrates an example method 1000 for a gNB to indicate in a RAR to a UE a channel quality associated with a reception of a PRACH preamble in a RO according to embodiments of present disclosure. FIG. 11 illustrates an example method 1100 for a UE receiving in a RAR a channel quality indication associated with a spatial setting used in PRACH transmission in a RO from the UE according to embodiments of present disclosure. FIG. 12 illustrates an example method 1200 for a UE determining spatial settings for a Msg3 PUSCH transmission based on an indication in a RAR for channel quality of spatial settings according to embodiments of present disclosure. FIG. 13 illustrates an example method 1300 for Msg3 PUSCH transmission form a UE receiving channel quality indications in a RAR associated with a PRACH transmission in ROs using corresponding spatial settings according to embodiments of present disclosure.

The steps of the methods 1000, 1100, 1200, and 1300 can be performed by any of the UEs 111-116 of FIG. 1, such as the UE 116 of FIG. 3 and a complementarity procedure may be preformed by a BS such as BS 102. The method 1000 of FIG. 10, method 1100 of FIG. 11, the method 1200 of FIG. 12, and the method 1300 of FIG. 13 are for illustration only and other embodiments can be used without departing from the scope of the present disclosure.

To allow selection of a spatial setting resulting to a larger SINR, among the possible SINRs for possible spatial settings for transmission of Msg3 PUSCH by a UE, an indication of a channel quality, such as a ranking of channel quality for each spatial setting, can be included in a RAR. A UE that receives the RAR is then indicated a channel quality corresponding to the spatial setting used to transmit the PRACH in a RO and selects the spatial setting with the best channel quality to transmit Msg3 PUSCH. For example, a UE transmits four different preambles in RO_1, RO_2, RO_3 and RO_4 using a first, second, third, and fourth spatial settings, respectively, and a gNB detects PRACH preambles for the first and second spatial settings. The gNB transmits a first RAR using a spatial setting associated with the first spatial setting wherein the first RAR includes scheduling information for Msg3 PUSCH transmission by the UE and channel quality indication for the first spatial setting associated to the first RO, and transmits a second RAR using a spatial setting associated with a second spatial setting wherein the second RAR includes scheduling information for Msg3 PUSCH transmission and channel quality indication for the second spatial setting associated to the second RO.

As shown in FIG. 10, a UE transmits one or more PRACH preambles in one or more ROs using respective one or more spatial settings (step 1010). In step 1020, a gNB detects one or more PRACH preambles from the UE that the gNB receives according to the one or more spatial settings in corresponding one or more ROs. In step 1030, the gNB determines a channel quality associated with the reception of each detected PRACH preamble received in a RO. In step 1040, the gNB indicates the channel quality in a RAR. In step 1050, the UE obtains the channel quality indication for the PRACH transmission in a RO through the RAR reception.

In certain embodiments, a gNB indicates a channel quality for a corresponding PRACH preamble reception in a field of an UL grant in a RAR message scheduling a PUSCH Msg3 PUSCH transmission. For example, a 2-bit field can be used to indicate a ranking of channel qualities associated with the transmission PRACH preambles in corresponding ROs. A UE can choose for Msg3 PUSCH transmission the spatial setting of the RO with the largest indicated channel quality value.

It is also possible that a UE compares an indicated channel quality value to a threshold. For example, the RAR indicates a quality value, for example using two bits that map to ranges of quality values that are either predetermined in the system operation or provided by a SIB. The UE can detect a RAR and receive a channel quality value associated with the transmission of a PRACH preamble in a RO with a spatial setting. The UE then compares the indicated quality value with a threshold. If the indicated quality value is above the threshold, the UE can transmit a Msg3 as scheduled by a corresponding UL grant. The threshold can be preconfigured by higher layers or be estimated by the UE considering in addition, for example, an estimated path-loss.

Upon transmission of more than one PRACH preambles in more than one corresponding ROs and reception of a RAR for one of the transmitted PRACH preambles with an indicated channel quality above a threshold, a UE may not expect to detect a RAR for other transmitted PRACH preambles. It is also possible that a UE attempts to detect a RAR for each of the transmitted preambles and then the UE can select a spatial setting with the indicated largest quality for Msg3 transmission. It is also possible that a gNB uses a 2-bit field to indicate a channel quality of a spatial setting.

To limit signaling overhead, it is also possible to use a 1-bit indication to indicate whether or not a spatial setting can be used for Msg3 transmission. For example, a bit value of '0' indicates poor channel quality and no further use of the corresponding spatial setting for transmissions from the UE, and a bit value of '1' indicates good channel quality and use of the corresponding spatial setting for transmissions from the UE.

When a UE receives multiple channel quality indications corresponding to multiple spatial settings, the UE can select a spatial setting with a good quality. If more than one spatial setting is indicated as having good quality, for example through a corresponding bit in a bitmap, the UE can autonomously select among such spatial settings, for example based on a received quality estimated by the UE, such as a SINR of a DMRS or a CSI-RS associated with a RAR reception for a spatial setting. It is also possible that when multiple spatial settings are indicated as having good quality or, in general, when multiple spatial settings are indicated for further transmissions, the UE transmits a Msg3 PUSCH using repetitions wherein all the multiple spatial settings are used for the repetitions.

As shown in FIG. 11, a UE receives a RAR corresponding to a PRACH preamble transmission and including an indication for a quality of a spatial setting (step 1110). In step 1120, the UE determines whether the quality of the spatial setting is above a threshold. Upon determining that the quality of the spatial setting is above the threshold, the UE transmits Msg3 PUSCH using a spatial setting associated with the indicated quality (step 1130). Alternatively, upon determining that the quality of the spatial setting is not above the threshold, the UE does not transmit Msg3 PUSCH (step 1140).

It is noted that the determination by the UE whether to transmit Msg3 PUSCH can also consider additional parameters such as an estimated path-loss. The UE may not expect to receive RAR associated with additional PRACH preambles.

As shown in FIG. 12, a UE receives in a RAR indications corresponding to spatial settings associated with PRACH preamble transmissions, such as indications for corresponding ROs (step 1210). In step 1220, the UE determines whether the UE is configured to transmit Msg3 PUSCH with repetitions. When the UE is configured to transmit Msg3 PUSCH using repetitions, the UE uses all indicated spatial settings for the repetitions (step 1230). Alternatively, when the UE is not configured to transmit Msg3 PUSCH using repetitions, the UE in step 1240, transmits a transmits Msg3 PUSCH without repetitions using one spatial setting.

As shown in FIG. 13, a UE receives a RAR in response to transmissions of PRACH preambles (Step 1310). The received RAR can include quality indications associated with the transmissions of the PRACH preambles in some ROs for some spatial settings. In step 1320, the UE determines the spatial setting with the largest indicated quality. In step 1330, the UE transmits Msg3 PUSCH using the spatial setting with the largest indicated quality.

Although FIG. 10 illustrates the method 1000, FIG. 11 illustrates the method 1100, FIG. 12 illustrates the method 1200, and FIG. 13 illustrates the method 1300 various changes may be made to FIGS. 10-13. For example, while the method 900 of FIG. 9 is shown as a series of steps, various steps could overlap, occur in parallel, occur in a different order, or occur multiple times. In another example, steps may be omitted or replaced by other steps. For example, steps of the method 900 can be executed in a different order.

Figure 14:
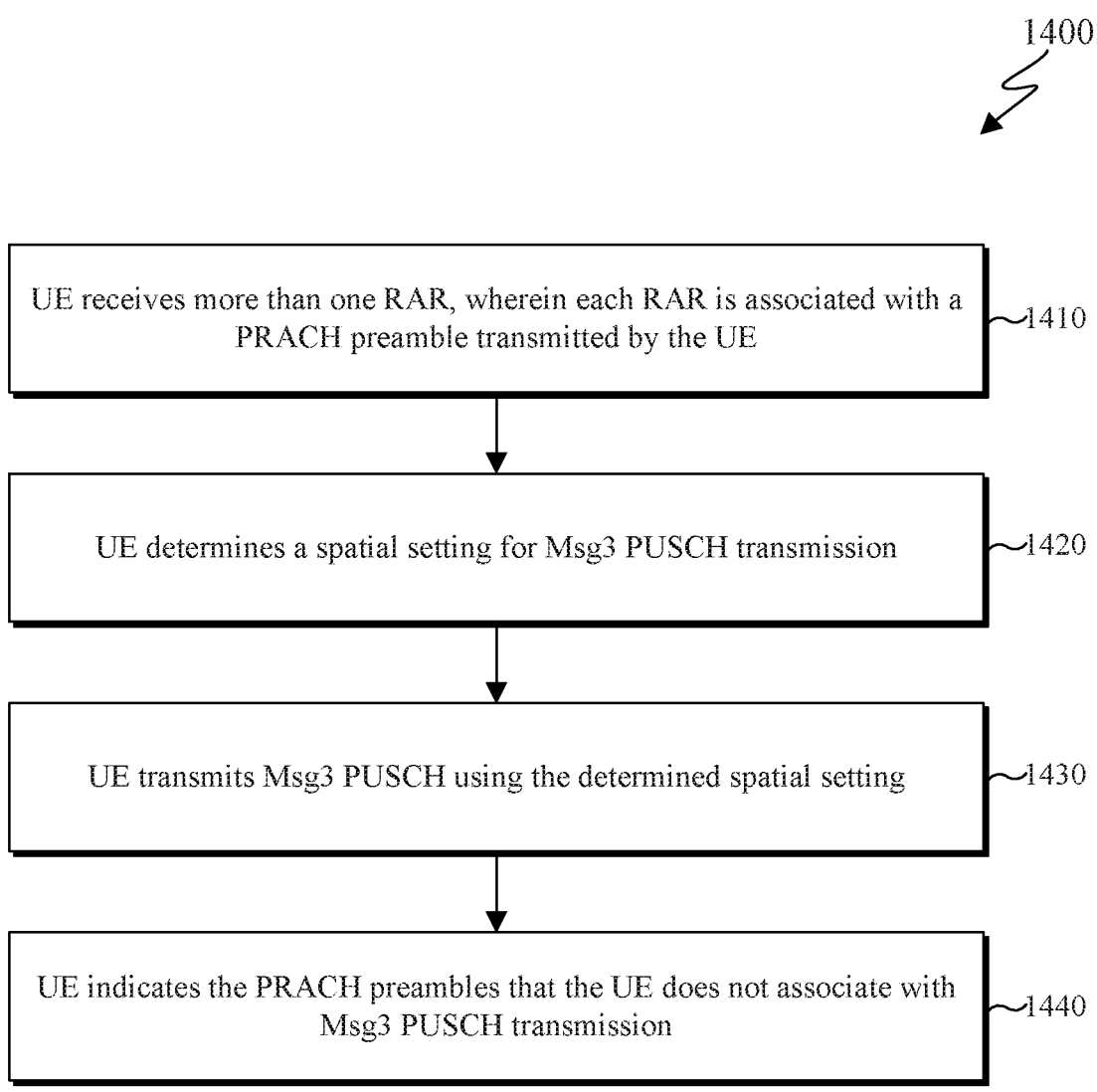
FIG. 14 illustrates an example method for a UE determining to indicate that a RA procedure associated with a PRACH preamble corresponding to a detected RAR is cancelled by the UE according to embodiments of present disclosure.

The following examples and embodiments such as those in FIG. 14, describe cancelling a RA procedure after a successful perception of a corresponding RAR.

In certain embodiments, when a UE transmits and a gNB detects more than one PRACH preamble and the UE receives multiple RARs that indicate reception by the gNB of PRACH preambles transmitted in respective ROs and with respective spatial settings, the UE selects a spatial setting associated with the transmission of a PRACH preamble in a respective RO to use for transmitting a Msg3 PUSCH. For other PRACH preambles that are successfully detected by gNB, the gNB may expect to receive a Msg3 PUSCH as scheduled by the associated UL grant in the corresponding RAR. The gNB may schedule retransmissions for Msg3 PUSCHs scheduled by an UL grant in RARs corresponding to detected PRACH preambles that are not received by the gNB as the gNB cannot be aware whether those detected PRACH preambles were transmitted by a same UE or by different UEs. When a UE receives RARs for more than one of the transmitted PRACH preambles, the UE can transmit a Msg3 PUSCH corresponding to one of the RARs and can indicate to the gNB that other PRACH preambles for which the UE received corresponding RARs are unused so that the gNB can know not to schedule Msg3 PUSCH retransmissions corresponding to the other PRACH preambles. The indication by the UE can be transmitted using the spatial setting associated to the RO of the corresponding PRACH preamble transmission, separately from the Msg3 PUSCH transmission, or it can be included in the information provided by Msg3 PUSCH for example through a MAC control element.

FIG. 14 illustrates an example method 1400 for a UE determining to indicate that a RA procedure associated with a PRACH preamble corresponding to a detected RAR is cancelled by the UE according to embodiments of present disclosure. The steps of the method 1400 can be performed by any of the UEs 111-116 of FIG. 1, such as the UE 116 of FIG. 3. The method 1400 of FIG. 14 is for illustration only and other embodiments can be used without departing from the scope of the present disclosure.

In step 1410, a UE receives more than one RAR, wherein each RAR is associated with a PRACH preamble transmitted by the UE. In step 1420, the UE determines a spatial setting for Msg3 PUSCH transmission from an indication in the RAR. For example, the UE determines a spatial setting for Msg3 PUSCH transmission from an indication in the RAR based on an indicated RO associated with the PRACH preamble. For another example, the UE determines a spatial setting for Msg3 PUSCH transmission from an indication in the RAR based on the indicated PRACH preamble. In step 1430, the UE transmits Msg3 PUSCH using the determined spatial setting. In step 1440, the UE indicates the PRACH preambles that the UE does not associate with Msg3 PUSCH transmission.

Although FIG. 14 illustrates the method 1400 various changes may be made to FIG. 14. For example, while the method 1400 of FIG. 14 is shown as a series of steps, various steps could overlap, occur in parallel, occur in a different order, or occur multiple times. In another example, steps may be omitted or replaced by other steps. For example, steps of the method 1400 can be executed in a different order.

The following examples and embodiments, describe a CSI report during initial access. In certain embodiments, after transmission of a Msg3 PUSCH, a PDSCH reception (Msg4) is used for contention resolution response and possibly for connection setup response. A PDSCH reception can use a spatial setting associated with the spatial setting of the Msg3 PUSCH transmission, or a spatial setting used for RAR reception, or the Msg4 reception can be with a relatively wide beam, for example with a same spatial setting used for reception of the corresponding SS/PBCH block. A gNB can indicate a CSI report request in RAR and the UE can multiplex a CSI report in Msg3 PUSCH. The gNB can use the CSI report to refine a spatial setting of Msg4 PDSCH transmission or, in general, to perform link adaptation for the Msg4 PDSCH transmission. The gNB can configure in a SIB a set of non-zero-power CSI-RS resources for the UE to measure in determining a CSI report for a spatial setting from multiple spatial settings corresponding to the CSI-RS resources, wherein a spatial setting can be identified by an index of a corresponding CSI-RS resource.

The following examples and embodiments, describe physical uplink control channel (PUCCH) and PUSCH transmission after UE is provided a C-RNTI. In certain embodiments, in response to a Msg3 PUSCH transmission scheduled by a RAR UL grant when a UE has not been provided a C-RNTI, the UE attempts to detect a DCI format, such as a DCI format 1_0, with CRC scrambled by a corresponding temporary cell RNTI (TC-RNTI) scheduling a PDSCH reception that includes a UE contention resolution identity. When the UE is provided with a cell RNTI (C-RNTI) and the UE is not configured a spatial setting for a PUCCH or a PUSCH transmission, the UE can transmit PUCCH and PUSCH with a relatively wide beam based on a spatial setting derived from the SS/PBCH block that the UE detected prior to initiating the random access procedure. To avoid a UE using a wide beam to transmit PUSCH or PUCCH after the UE is provided a C-RNTI, the UE can continue to use a spatial setting that the UE used for Msg3 PUSCH transmission until the UE is provided a new spatial setting for PUSCH or PUCCH transmissions by the gNB, for example through higher layer signaling. For example, the gNB can determine the new spatial setting based on a beam management procedure that the UE performs after the UE is provided a C-RNTI and other UE-specific configurations.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE), the method comprising:

identifying a set of physical random access channel (PRACH) occasions for PRACH repetitions, wherein N PRACH occasions are included in the set of PRACH occasions;

performing a transmission of N PRACH repetitions on the set of PRACH occasions;

receiving a physical downlink control channel (PDCCH) scheduling a reception of a physical downlink shared channel (PDSCH) based on a random access radio network temporary identifier (RA-RNTI), wherein the RA-RNTI is computed based on a last PRACH occasion in the set of PRACH occasions;

receiving the PDSCH based on the PDCCH, wherein;

a random access response (RAR) is included in the PDSCH, and the RAR includes an indication for a first PRACH occasion or a second PRACH occasion; and transmitting a first PUSCH, and any PUSCH after the first PUSCH until reception of information indicating use of a spatial setting, using:

a first spatial setting, when the indication is for the first PRACH occasion from the set of PRACH occasions, and a second spatial setting, when the indication is for the second PRACH occasion from the set of PRACH occasions.

2. The method of claim 1, wherein the set of PRACH occasions for the PRACH repetitions is defined by a signaling from a base station.

3. The method of claim 1, wherein the set of PRACH occasions for the PRACH repetitions is selected by the UE based on a signaling from a base station.

4. The method of claim 1, wherein the N PRACH occasions in the set of PRACH occasions are consecutive.

5. The method of claim 1, wherein the set of PRACH occasions is associated with a same SS/PBCH block index.

6. A user equipment (UE), comprising:

a processor configured to identify a set of physical random access channel (PRACH) occasions for PRACH repetitions, wherein N PRACH occasions are included in the set of PRACH occasions; and a transceiver operably coupled to the processor, the transceiver configured to:

perform a transmission of N PRACH repetitions on the set of PRACH occasions;

receive a physical downlink control channel (PDCCH) scheduling a reception of a physical downlink shared channel (PDSCH) based on a random access radio network temporary identifier (RA-RNTI), wherein the RA-RNTI is computed based on a last PRACH occasion in the set of PRACH occasions;

receive the PDSCH based on the PDCCH, wherein a random access response (RAR) is included in the PDSCH and wherein the RAR includes an indication for a first PRACH occasion or a second PRACH occasion; and transmit a first PUSCH, and any PUSCH after the first PUSCH until reception of information indicating use of a spatial setting, using:

a first spatial setting, when the indication is for the first PRACH occasion from the set of PRACH occasions, and a second spatial setting, when the indication is for the second PRACH occasion from the set of PRACH occasions.

7. The UE of claim 6, wherein the set of PRACH occasions for the PRACH repetitions is defined by a signaling from a base station.

8. The UE of claim 6, wherein the set of PRACH occasions for the PRACH repetitions is selected by the UE based on a signaling from a base station.

9. The UE of claim 6, wherein the N PRACH occasions in the set of PRACH occasions are consecutive.

10. The UE of claim 6, wherein the set of PRACH occasions is associated with a same SS/PBCH block index.

11. A base station (BS), comprising:

a processor; and a transceiver operably coupled to the processor, the transceiver configured to:

receive N physical random access channel (PRACH) repetitions on a set of PRACH occasions, wherein N PRACH occasions are included in the set of PRACH occasions;

transmit a physical downlink control channel (PDCCH) scheduling a transmission of a physical downlink shared channel (PDSCH) based on a random access radio network temporary identifier (RA-RNTI), wherein the RA-RNTI is computed based on a last PRACH occasion in the set of PRACH occasions;

transmit the PDSCH based on the PDCCH, wherein a random access response (RAR) is included in the PDSCH and wherein the RAR includes an indication for a first PRACH occasion or a second PRACH occasion; and receive a first PUSCH, and any PUSCH after the first PUSCH until reception of information indicating use of a spatial setting, using:

a first spatial setting, when the indication is for the first PRACH occasion from the set of PRACH occasions, and a second spatial setting, when the indication is for the second PRACH occasion from the set of PRACH occasions.

12. The BS of claim 11, wherein the set of PRACH occasions for the PRACH repetitions is defined by a signaling from the BS.

13. The BS of claim 11, wherein the set of PRACH occasions for the PRACH repetitions is selected by a user equipment based on a signaling from the BS.

14. The BS of claim 11, wherein the N PRACH occasions in the set of PRACH occasions are consecutive.

15. The BS of claim 11, wherein the set of PRACH occasions is associated with a same SS/PBCH block index.

* * * * *